(12) United States Patent
Wilcoxson et al.

(10) Patent No.: US 6,321,065 B1
(45) Date of Patent: Nov. 20, 2001

(54) PERFORMANCE ENHANCEMENT OF OPEN-LOOP POWER CONTROL FOR SATELLITE COMMUNICATION SYSTEMS

(75) Inventors: Donald C. Wilcoxson, Redondo Beach; Eldad Perahia, Hermosa Beach, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/183,406

(22) Filed: Oct. 30, 1998

(51) Int. Cl.[7] .............................. H04B 1/60; H04B 17/02; H04B 7/185; H04B 7/005; H04B 7/015; H01Q 3/00

(52) U.S. Cl. .......................... 455/10; 455/12.1; 455/504; 455/505; 342/358; 342/359

(58) Field of Search .............................. 455/10, 12.1, 65, 455/68, 69, 70, 504–506; 342/358, 359

(56) References Cited

U.S. PATENT DOCUMENTS

| | | | |
|---|---|---|---|
| 4,910,792 | * | 3/1990 | Takahata et al. ...................... 455/10 |
| 5,060,292 | * | 10/1991 | Ayukawa et al. ...................... 455/52 |
| 5,258,764 | * | 11/1993 | Malinkowski ...................... 342/359 |
| 5,697,050 | * | 12/1997 | Wiedeman ........................ 455/12.1 |
| 5,758,260 | * | 5/1998 | Wiedeman ........................ 455/12.1 |
| 5,854,609 | * | 12/1998 | Pyo et al. .............................. 342/359 |
| 5,933,111 | * | 8/1999 | Schroeder et al. .................... 342/359 |

OTHER PUBLICATIONS

Dissanayake, Asoka W., "Application of Open–Loop Uplink Power Control in Ka–Band Satellite Links," Proceedings of the IEEE, vol. 85, No. 6, Jun. 1997, pp. 959–969.

\* cited by examiner

*Primary Examiner*—Daniel Hunter
*Assistant Examiner*—Meless Zewdu
(74) *Attorney, Agent, or Firm*—McAndrews, Held & Malloy, Ltd.

(57) ABSTRACT

The present invention provides an open-loop method for determining uplink transmission power in a satellite communication system 200 that compensates for antenna pointing error attenuation and for rain attenuation. Satellite downlink signal 208 attenuation is measured. Antenna pointing information is then used in conjunction with antenna gain pattern information 400 to determine antenna pointing error attenuation. The measured downlink attenuation and antenna pointing error attenuation are then used to determine the amount of rain attenuation on the downlink 208. The downlink attenuation information is then used to determine the amount of uplink 216 attenuation to be expected. Uplink transmission power levels are then adjusted accordingly to overcome the expected uplink 216 attenuation.

20 Claims, 4 Drawing Sheets

_PERFORMANCE ENHANCEMENT OF
OPEN-LOOP POWER CONTROL FOR
SATELLITE COMMUNICATION SYSTEMS_

CROSS-REFERENCE TO RELATED
APPLICATIONS

This application is related to a commonly assigned application entitled "Method for Enhancing the Performance of a Satellite Communications System Utilizing Multibeam Antennas", having inventors Donald Craig Wilcoxson and Eldad Perahia, filed on the same date as this application. That application is incorporated herein by reference in its entirety.

BACKGROUND OF THE INVENTION

The present invention generally relates to transmission power control for satellite communication systems. In particular, the present invention relates to a method for calculating uplink transmission power adjustments necessary to compensate for environmental effects such as the effects of rain attenuation (also known as rain fade) and antenna pointing error in a satellite communication system.

Satellites have long been used to provide communications capabilities on a global scale. Typically, a modem communications satellite includes multiple uplink and downlink antennas, each of which provides communications bandwidth to a large coverage area (or "footprint") using multiple spot beams. Modem satellite antennas operate at much higher carrier frequencies than those in previous systems. Thus, for example, modem satellites may use Ka-band frequency uplinks (at approximately 30 GHz) and downlinks (at approximately 20 GHz), while previous satellites used Ku- or C-Band frequency uplinks and downlinks (approximately 3–12 GHz).

Ka-band frequency downlinks generate relatively small spot beams on the surface of the Earth. The area covered by a spot beam is commonly referred to as a cell. When spot beams are transmitted by a geosynchronous satellite, the diameter of an associated cell may be 300–400 miles. Generally, boundaries of a cell may be the points in the spot beam where the antenna gain falls to a minimally acceptable level, e.g., -5 or -6 dB, relative to the gain at the center of the spot beam. Thus, a large number of spot beams may be required to cover a large land mass.

Modem satellite communications systems operate with uplinks and downlinks at much higher carrier frequencies than earlier systems (for example, at Ka-Band). Consequently, modem satellite communications systems are susceptible to significant signal attenuation due to atmospheric conditions such as rain. Rain attenuation of the uplink and downlink represents a primary obstacle that must be overcome to achieve successful communication in the Ka-band. In the past, attempts to overcome rain attenuation problems typically have centered on transmission power control techniques. In general, conventional power control techniques attempt to adjust the transmission power of a ground terminal such that the power arriving at the satellite is constant, regardless of the rain attenuation affecting the uplink. Thus, when it rains and the attenuation due to rain increases, so does the ground terminal's transmission power. When the rain subsides, the ground terminal's transmission power is lowered commensurate with the current rain attenuation. Thus, conventional power control techniques are based on the magnitude of the rain attenuation.

Techniques have been proposed that attempt to correct for rain attenuation in order to maintain a constant level of received power at the satellite. As an example, Dissanayake, Asoka W., "Application of Open-Loop Uplink Power Control in Ka-Band Satellite Links," _Proceedings of the IEEE_, Vol. 85, No. 6, June 1997, pgs. 959–969, discloses a type of open-loop power control in which beacon signals are implemented and signal levels measured. The system described by Dissanayake includes a satellite beacon in the downlink signal. Dissanayake measures characteristics of the beacon received at an earth station. A corrective uplink power level is calculated based on the measured characteristics and based on knowledge of the effects of various atmospheric phenomena.

Another technique is disclosed in U.S. Pat. No. 4,910,792, which uses bent-pipe transponders on board the satellite to relay an uplink signal back to earth for measurement. Bent-pipe transponders relay uplink signals back to earth in downlink signals without any demodulation or remodulation. The '792 patent discloses a technique which compares two signals. One signal is a reference signal sent from a reference station to a satellite in an uplink which is then relayed to an earth station in a downlink, and the other signal is an uplink signal sent from the ground station to the satellite in an uplink which is then relayed back to the earth station in a downlink. The results of the signal comparison are then used to adjust uplink transmission power.

One drawback of bent-pipe techniques is that they cannot be directly implemented on more versatile decoding and switching satellite systems which do not include bent-pipe transponders. Another drawback is that imperfections in the uplink signal are included in the transponded downlink signal. Imperfections in the uplink signal render it difficult, if not impossible, to completely separate the atmospheric effects on the uplink from the atmospheric effects on the downlink.

However, conventional power control techniques have experienced certain disadvantages since they have failed to realize that rain attenuation is only one significant contributor to attenuation. Conventional power control techniques have failed to give special consideration to the effects of satellite antenna pointing error and the resultant shifts in spot beams and the overall antenna pattern. Antenna patterns are directional, and thus an incorrectly pointed antenna creates unexpected signal strength variations at the receiving mobile user or ground station. The affects of antenna pointing error are most pronounced near the boundaries of a spot beam or cell. In the past, most satellite communication systems were designed to cover relatively broad coverage areas (e.g., the United States). With a broad coverage area, the vast majority of terrestrial users are located well within the boundaries of the coverage area. Thus, the affects of relatively small satellite or antenna pointing errors are generally negligible. However, more recently proposed cellular satellite communications systems use spot beams which provide relatively small cells (e.g., covering a single city or region). Hence, the percentage of terrestrial users near the boundaries of the coverage area of each cell is no longer negligible. In addition, transmission power control in cellular communications systems assumes additional importance due to the high degree of frequency reuse and resulting cross-cell interference that occurs with improper transmission power control.

Past open-loop power control techniques generate significant errors in the estimate of the adjustment necessary in uplink transmission power when sources other than rain (particularly antenna pointing error) contribute to the downlink attenuation. As noted above, for ground terminals near the edge of the spot beam, antenna pointing errors may result in significant uplink and downlink attenuation. Misclassifying attenuation due to antenna pointing error as attenuation due to rain when estimating the uplink attenuation from the downlink attenuation can lead to significant errors, as explained below.

Atmospheric conditions, such as rain, may attenuate the uplink and downlink signals differently, depending on the uplink and downlink frequencies. For example, for communications signals in the Ka-band, the uplink attenuation due to rain may be approximately 2.25 times greater (when measured in decibels (dB)) than the downlink attenuation due to rain.

Atmospheric conditions, such as rain, may have uneven attenuation effects upon communications signals in the uplink and downlink because communications signals in the uplink have a different carrier frequency than signals in the downlink. For example, uplink signals may have a carrier frequency of approximately 30 GHz, while downlink signals may have a carrier frequency of approximately 20 GHz. The difference in carrier frequencies renders signals in the uplink much more susceptible to attenuation due to certain atmospheric conditions, such as rain, than signals in the downlink.

However, antenna pointing error may cause approximately the same amount of attenuation of communications signals in the uplink as in the downlink. An antenna has a predetermined gain pattern distributed across a given cell. As the antenna moves with respect to the cell, the antenna gain pattern across the cell similarly moves. Thus, when an antenna is pointed correctly, a mobile station or ground station in the corresponding cell is located at a known gain level along the gain pattern. However, when an antenna is misaligned, the associated antenna gain pattern is similarly misaligned with respect to the cell and to mobile stations or ground stations in the cell. Consequently, mobile or ground stations will experience attenuation (or amplification) due to a difference between the expected known gain level and an actual mis-aligned gain level. An antenna gain pattern may be designed to be roughly identical for two or more carrier frequencies. Therefore, signals in the uplink and in the downlink experience the same amount of attenuation due to antenna pointing error.

For example, a 5 dB loss may be measured in the downlink, and 3 dB of the loss may be due to antenna pointing error, and 2 dB of the loss due to rain. In conventional systems all of the attenuation would be attributed to rain, and therefore, a power correction for the uplink of 11.25 dB (2.25*5 dB) would be calculated. However, a more appropriate power correction would have been 7.5 dB (3 dB for antenna pointing error, and 2.25*2 dB for rain attenuation). Thus, past techniques overcompensate for attenuation. As a result, power is wasted, and cross-cell interference is increased unnecessarily.

A need exists for providing a method for determining appropriate uplink power correction under conditions of combined rain attenuation and antenna pointing error.

SUMMARY OF THE INVENTION

It is an object of the present invention to overcome the disadvantages previously experienced by implementing an improved open-loop power control technique for satellite communication systems.

Another object of the present invention is to provide an open-loop power control technique which determines appropriate adjustments to uplink transmission power level based on measurements and calculations of rain attenuation in the downlink.

Another object of the present invention is to provide an open-loop power control technique for satellite communication systems in which antenna pointing direction is considered in the calculation of uplink transmission power adjustments.

Another object of the present invention is to provide an open-loop power control technique for satellite communication systems in which antenna pointing error attenuation and rain attenuation are separated and treated accordingly in the calculation of appropriate uplink transmission power adjustments.

The preferred embodiment of the present invention provides an open-loop method for determining uplink transmission power adjustments in a satellite communication system that compensates for antenna pointing error and for rain attenuation. The method obtains measurements of downlink attenuation levels. Antenna pointing information is used in combination with antenna gain pattern information and location information to determine antenna pointing error attenuation. The amount of rain attenuation is calculated based on the measured attenuation and the antenna pointing error attenuation. The amount of attenuation expected on the uplink is calculated based on the determined antenna pointing error attenuation and the determined rain attenuation.

DETAILED DESCRIPTION OF THE PREFERRED EMBODIMENT

Figure 1:
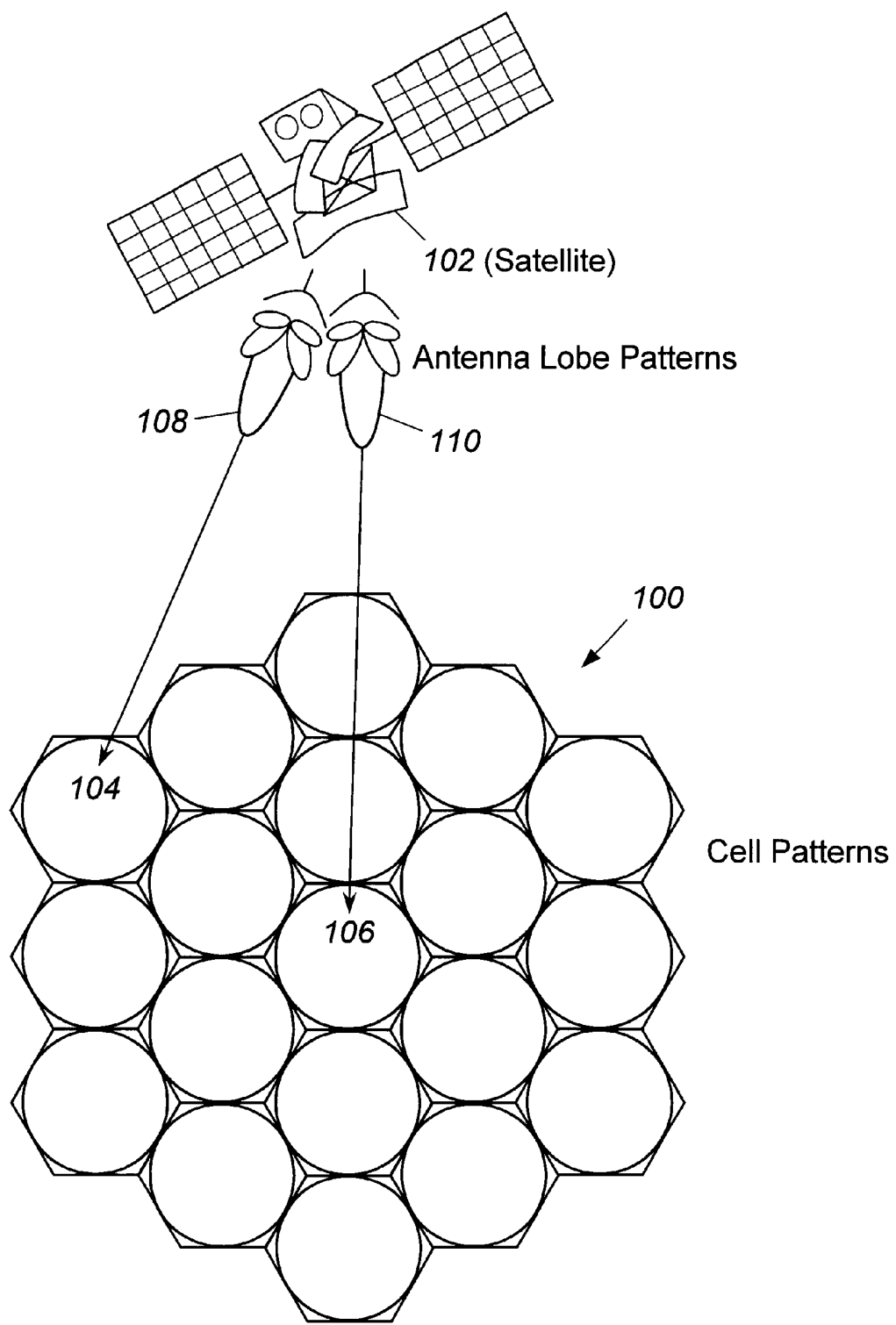
FIG. 1 illustrates the cellular structure of a satellite communication system according to a preferred embodiment of the present invention.

FIG. 1 illustrates a cellular satellite communication system which includes a pattern of cells 100 in which ground stations communicate with a satellite 102. A common characteristic of cellular communication systems is a high degree of frequency reuse. Cells in close proximity, but typically not adjacent to each other, use the same frequencies. In FIG. 1, for example, the center cell 106 may use the same frequencies as the upper left cell 104. Due to imperfections in antenna patterns (as illustrated in FIG. 1 as simplified lobe patterns 108 and 110), cells using the same frequencies are not completely isolated from each another and will interfere with each other accordingly. In FIG. 1, for example, communication signals in the center cell 106 may cause interference with signals in the upper-left cell 104 and vice versa. As will be apparent in the discussion below, the preferred embodiment of the present invention may be used to reduce interference by correctly determining the transmission power levels required in the uplink to achieve reliable communication with the satellite 102.

The burden of providing the desired power levels, as received by the satellite 102, falls on mobile terminals and/or ground stations of the satellite communication system. Under ideal conditions, the transmission power levels of the mobile terminals and/or ground stations in the satellite communication system are reasonably well known. However, periodic and often unpredictable variations in the system operating environment affect the attenuation of the uplink signals, and thereby require appropriate adjustments in the uplink transmission power levels.

Figure 2:
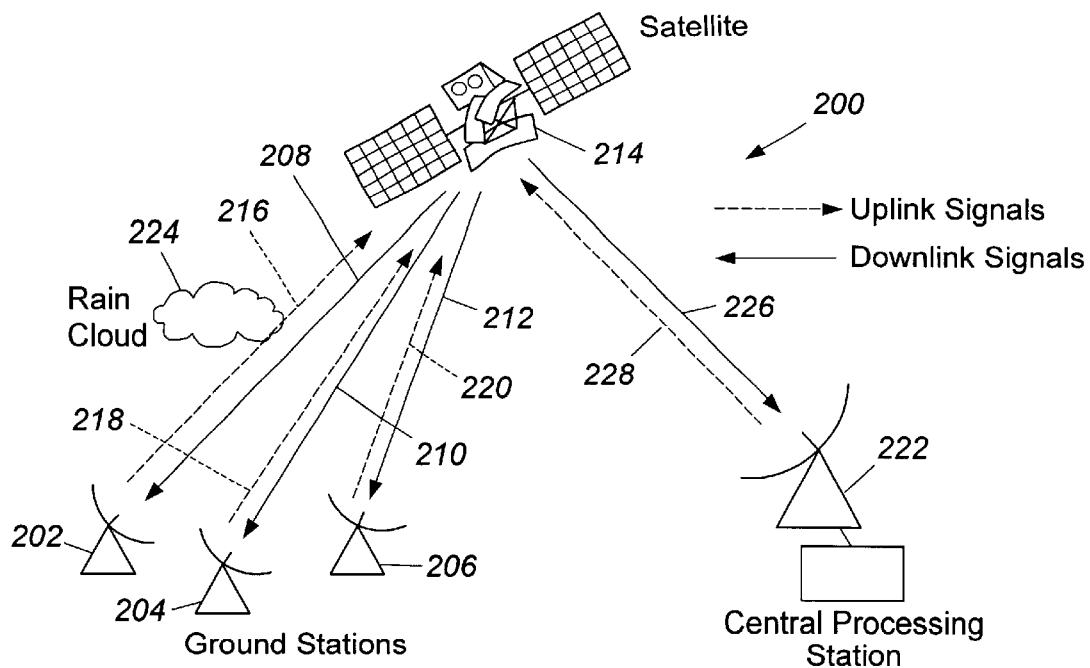
FIG. 2 illustrates an open-loop power control system for a satellite communication system according to a preferred embodiment of the present invention.

FIG. 2 illustrates the components of one embodiment of the transmission power control system of the present invention 200. A set of mobile terminals and/or ground stations 202, 204, and 206 receive downlink communication signals 208, 210, and 212, respectively, from a satellite 214 and send uplink communication signals 216, 218, and 220, respectively, to the satellite 214. FIG. 2 illustrates ground stations 202, 204, and 206 with directional antennas. However mobile terminals and/or ground stations with omni-directional antennas may also be used. The system also includes a central processing station 222. An atmospheric event, such as rain 224, is shown occurring in the communication path between the satellite 214 and a ground station 202.

The ground stations 202, 204 and 206 may be located in a single cell generated by a particular spot beam or may be located in different cells. Each spot beam has an associated gain pattern distributed across the cell. The cells may be geographically fixed or may be defined by the spot beam. The gain pattern of a spot beam determines the variation in spot beam strength across the cell. Typically, the center of a cell is exposed to the greatest level of spot beam energy, principally, because antenna pointing results in the lobe pattern being centered around the desired center of each cell. The spot beam strength at the edges of a cell may differ by as much as 5 or 6 dB from the center of the cell. In addition, the change of spot beam strength with respect to distance from the spot beam center may be significantly greater near the edges of the spot beam than near the center of the spot beam. Therefore, slight variations in pointing error affect the spot beam strength at the edges much more than the spot beam strength at the center of the cell. The gain pattern for each spot beam may be determined, for example, by mathematical modeling, laboratory measurement before launch, or direct measurement after launch. As will be explained below, once the gain pattern is determined, it is used to determine antenna pointing error attenuation in the satellite communication system.

Figure 5:
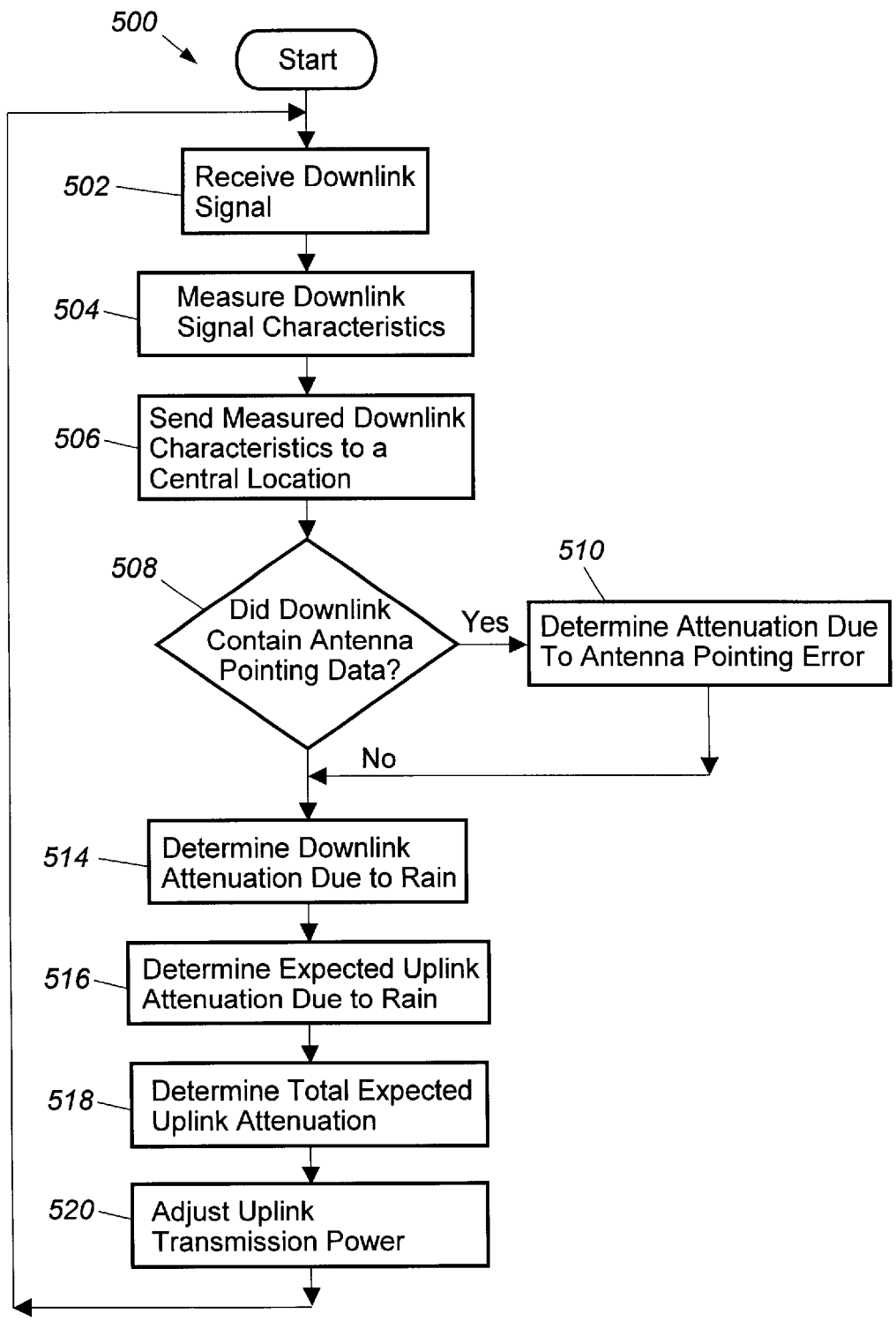
FIG. 5 illustrates an uplink power control method for a satellite communication system according to a preferred embodiment of the present invention.

FIG. 5 illustrates a method of uplink power control for a preferred embodiment of the present invention 500. The ground station 202 receives a downlink signal 208 (step 502 in FIG. 5). The ground station 202 measures the power level (i.e. signal strength) of the received downlink signal 208 (step 504 in FIG. 5). The measured downlink signal 208 may be a standard communications signal, a beacon signal containing no communication information, or any other signal sent from the satellite 214 to the ground station 202. Optionally, other characteristics of downlink signal 208, such as signal-to-noise ratio, may be measured. Using the gain pattern of the spot beam in which the ground station 202 resides, as well as its own location within the gain pattern, the ground station 202, determines attenuation of the downlink signal 208 that should be present due to antenna pointing error. The ground station 202 may then determine, based on its measurements, the current attenuation resulting from the rain 224. In a like manner, the other ground stations 204 and 206 determine the downlink attenuation levels of signals received in the associated downlinks 210 and 212, respectively. The ground stations 202, 204 and 206 send the downlink attenuation levels through respective uplinks 216, 218 and 220 to the satellite 214 (step 506 in FIG. 5). The satellite 214 sends the downlink attenuation levels to the central processing station 222 through the central processing station downlink 226. The downlink attenuation levels, may alternatively be sent to the central processing station 222 using ground-based networks.

The ground stations 202, 204 and 206 may be small earth stations, satellite cellular phones, large earth terminals, etc. as long as their positions within respective spot beams is known in order to determine the amount of attenuation due to antenna pointing error. In addition, downlink signal characteristics other than attenuation (e.g. signal to noise ratio) may be included in the information sent to the central processing station 222.

Figure 3:
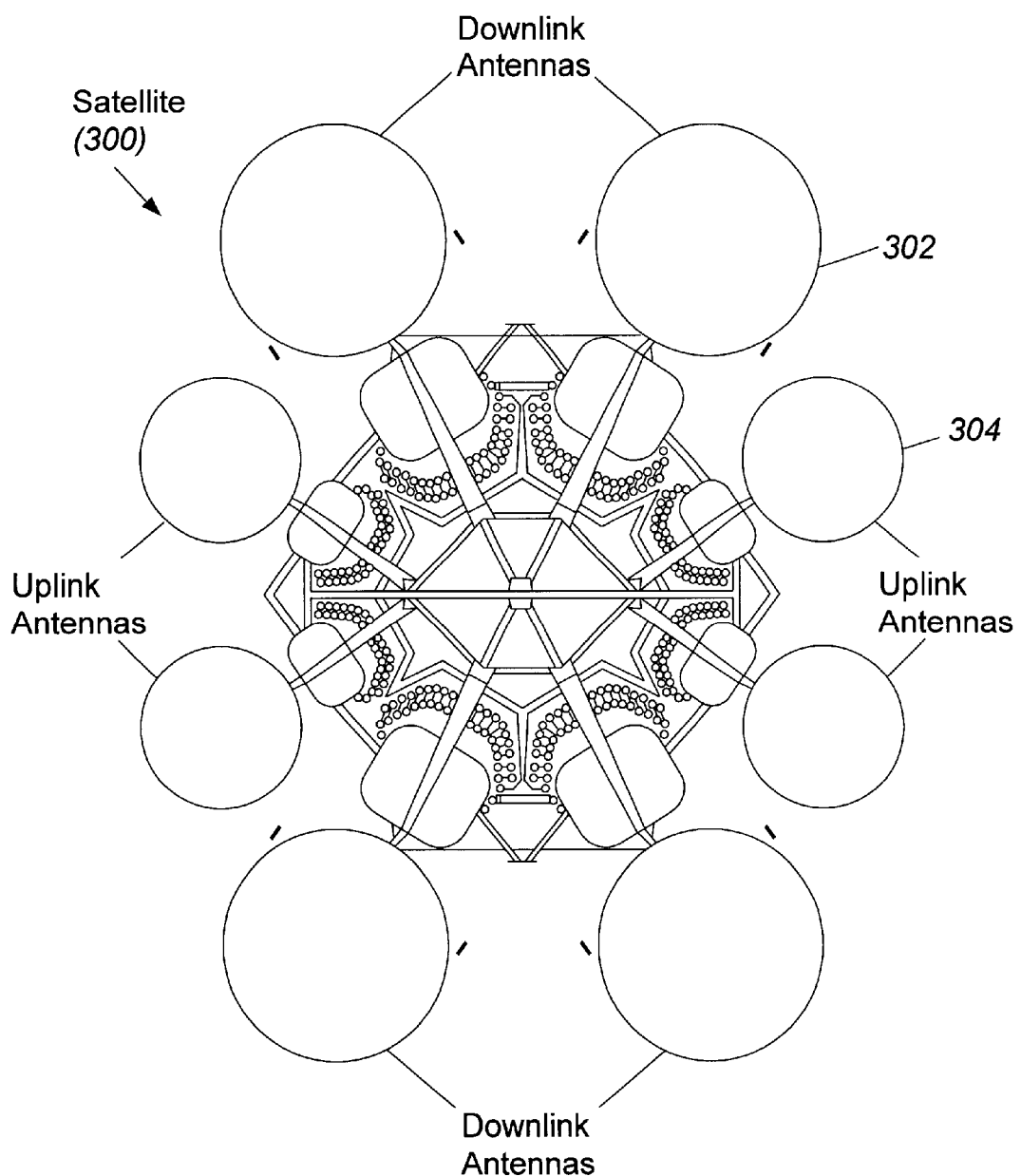
FIG. 3 illustrates an example of a satellite with a multi-beam antenna design according to a preferred embodiment of the present invention.

In satellites that have a known directional relationship between the satellite uplink and downlink antennas, information regarding downlink antenna pointing may be used to derive information regarding satellite uplink antenna pointing information. FIG. 3 illustrates a satellite 300 with four pairs of uplink and downlink antennas. One such pair consists of a downlink antenna 302 and an uplink antenna 304. As long as the directional relationship between the downlink antenna 302 and the uplink antenna 304 is known, pointing direction information derived for a downlink antenna 302 may be used to derive pointing direction information for an uplink antenna 304.

Once the central processing station 222 receives the downlink attenuation levels, or measurements of other downlink signal characteristics such as signal-to-noise ratio, from the ground stations 202, 204 and 206, the central processing station 222 determines the pointing direction of the satellite antennas. Three parameters (attitude components) are generally considered to determine the pointing direction of a satellite: roll, pitch, and yaw. Typically, the roll axis is defined to be in the direction of the satellite velocity vector and is in the plane of the orbit. The pitch is defined as an axis perpendicular to the roll axis and perpendicular to the orbit plane. Finally, the yaw axis is perpendicular to each of the roll and pitch axes and is in the plane of the orbit. Therefore, when the satellite rotates about the yaw axis, the downlink spot beams may similarly rotate about the yaw axis. However, when the satellite rotates about the roll and pitch axes, the downlink spot beams move perpendicular to the velocity vector or parallel to the velocity vector, respectively.

Once the uplink antenna pointing information is calculated, antenna pointing information is disseminated to the ground stations. In the system illustrated in FIG. 2, the antenna pointing information is sent from the central processing station 222 to the satellite 214 through the central processing station uplink 228. The satellite 214 then disseminates the antenna pointing information to the ground stations 202, 204 and 206 through their respective downlinks 208, 210 and 212. Alternatively, the antenna pointing information sent may be disseminated to the ground stations 202, 204 and 206 through the use of landlines and other available communication methods.

Figure 4:
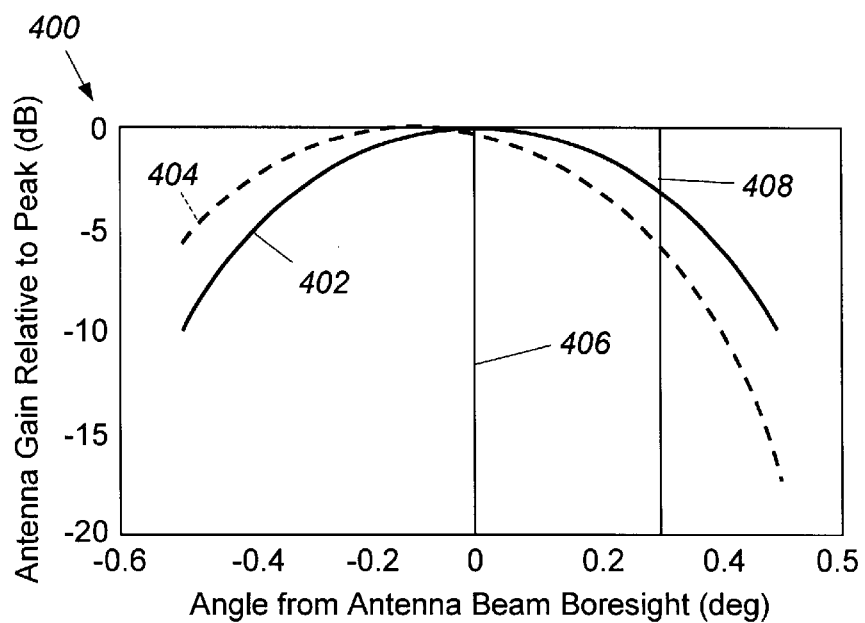
FIG. 4 illustrates the effects of errors in antenna pointing according to a preferred embodiment of the present invention.

Once the ground stations 202, 204 and 206 receive the antenna pointing information, they determine, in conjunction with their individual geographic location information and gain pattern information, the amount of downlink attenuation caused by antenna pointing error (steps 508 and 510 in FIG. 5). FIG. 4 illustrates one example of the effect of antenna pointing error on spot beam strength. FIG. 4 plots the angle from the antenna beam boresight (i.e., the center of the antenna) against the antenna gain relative to the peak gain produced by the antenna. FIG. 4 illustrates two plots. The first plot denoted by a solid line 402 is without any antenna pointing error. The second plot denoted by a dashed line 404 represents a plot for an antenna with a 0.1 degree shift away from the desired antenna pointing direction. As mentioned earlier, the attenuation due to a 0.1 degree antenna pointing error, which is shown as the difference between the two plots 402 and 404, may be less significant for an earth station located near the center of a cell, as denoted by vertical line 406 in FIG. 4 (boresight angle of 0). However, for an earth station located closer to a cell edge, as denoted by vertical line 408 (boresight angle of approximately 0.3 degrees), the attenuation due to a 0.1 degree antenna pointing error is approximately 3 dB.

Once the ground stations 202, 204 and 206 have calculated the amount of downlink attenuation due to antenna pointing error, they proceed to determine the amount of measured downlink attenuation that was due to sources other than antenna pointing error (step 514 in FIG. 5). As an example, the ground station 202 may experience the rain event 224 and measure a downlink attenuation level of 5 dB. The ground station 202 may receive information from the central processing station 222 indicating that an antenna pointing error of -0.1 degree exists, and that ground station 202 may be located at a 0.3 degree angle from the boresight (position in gain pattern denoted by line 408 in FIG. 4). Once the ground station 202 receives the above information, it will calculate that approximately 3 dB of the 5 dB of downlink attenuation was due to antenna pointing error (the difference between plots 402 and 404 at line 408 in FIG. 4). The ground station 202 determines that the remaining downlink attenuation of approximately 2 dB was due to causes other than antenna pointing error. The ground station 202 assumes that, in the absence of antenna pointing error, rain attenuation is the dominant source of attenuation. Optionally, filtering techniques may be used to filter out attenuation due to atmospheric effects occurring at higher and lower frequencies than rain events.

The required uplink transmission power is calculated by the ground station 202 (steps 516 and 518 in FIG. 5). The change in uplink transmission power (positive or negative) due to antenna pointing error is not generally a function of frequency. Therefore, if a ground station calculates a loss of 3 dB due to antenna pointing error in the downlink, an expected loss of 3 dB due to antenna pointing error would be expected for a similarly pointed uplink antenna. However, in the frequency range of the Ka-band and EHF band, rain attenuation is significantly dependent upon frequency. For example, if a ground station calculates a loss of 2 dB due to rain fade on a 20 GHz downlink, an expected loss of approximately 4.5 dB (2.25*2 dB) may be expected on a 30 GHz uplink. Combining the above exemplary antenna pointing error attenuation and rain attenuation, the ground station would measure 5 dB attenuation. The ground station 202 would determine an appropriate change in uplink transmission power of 7.5 dB (3 dB+4.5 dB). Once the expected attenuation of the uplink is calculated, the uplink transmission power of the ground station is adjusted accordingly (step 520 in FIG. 5).

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of controlling uplink transmission power in a satellite communication system having at least one satellite for transmitting and receiving communications signals over a downlink and uplink respectively, the method comprising:

measuring downlink attenuation of a communications signal passing over the downlink from the satellite;

determining an amount of an antenna pointing error attenuation component of said downlink attenuation and an amount of an atmospheric attenuation component of said downlink attenuation; and adjusting uplink transmission power based on said amount of the antenna pointing error attenuation component and said amount of the atmospheric attenuation component to compensate for said downlink attenuation.

2. The method of claim 1 wherein said step of determining an amount of an antenna pointing error attenuation component comprises:

receiving antenna pointing information; and determining said amount of the antenna pointing error attenuation component as a function of said antenna pointing information.

3. The method of claim 1 wherein said step of determining an amount of an antenna pointing error attenuation component comprises:

receiving antenna pointing information; and determining said amount of the antenna pointing error attenuation component based on said antenna pointing information and based on antenna gain pattern information.

4. The method of claim 1, wherein determining an amount of an atmospheric attenuation component comprises determining an amount of a rain fade attenuation component.

5. The method of claim 1, wherein adjusting comprises adjusting uplink transmission power based on said amount of the antenna pointing error attenuation component, said amount of the atmospheric attenuation component, and an expected atmospheric attenuation factor between an uplink transmit frequency and a downlink receive frequency.

6. The method of claim 5, wherein adjusting comprises adjusting uplink transmission power according to:

p+(a−p)*f, where p is said antenna pointing error attenuation component, a is said downlink attenuation, and f is said expected atmospheric attenuation factor.

7. A method of controlling an uplink transmission power in a satellite communication system having at least one satellite for transmitting and receiving communications signals over a downlink and uplink respectively, the downlink communications signal being attenuated by a downlink attenuation level while traveling over the downlink, the downlink attenuation level having a downlink attenuation component caused by satellite antenna pointing error and a downlink attenuation component caused by rain, the uplink communications signal being attenuated by an uplink attenuation level while traveling over the uplink, the uplink attenuation level having an uplink attenuation component caused by satellite antenna pointing error and an uplink attenuation component caused by rain, the method comprising:

determining an amount of a downlink attenuation component caused by satellite antenna pointing error;

determining an amount of a downlink attenuation component caused by rain by measuring a downlink attenuation amount and subtracting the amount of said downlink attenuation component caused by satellite antenna pointing error from said downlink attenuation amount; and adjusting an uplink transmission power based on the amount of the downlink attenuation component caused by satellite pointing error and based on the amount of the downlink attenuation component caused by rain.

8. The method of claim 7 wherein said step of determining an amount of a downlink attenuation component caused by satellite antenna pointing error comprises:

receiving antenna pointing information; and determining said amount of the downlink attenuation component caused by satellite antenna pointing error based on said antenna pointing information and based on antenna gain pattern information.

9. The method of claim 7 wherein said step of adjusting an uplink transmission power comprises:

determining an amount of an anticipated uplink attenuation component caused by antenna pointing error based on said amount of the downlink attenuation component caused by antenna pointing error;

determining an amount of an anticipated uplink attenuation component caused by rain based on said amount of the downlink attenuation component caused by rain; and adjusting said uplink transmission power based on said amount of the anticipated uplink attenuation component caused by antenna pointing error and based on said amount of the anticipated uplink attenuation component caused by rain.

10. The method of claim 7 wherein said step of determining an amount of a downlink attenuation component caused by satellite antenna pointing error comprises:

receiving antenna pointing information; and determining said amount of the downlink attenuation component caused by satellite antenna pointing error based on said antenna pointing information and based on antenna gain pattern information;

wherein said step of adjusting an uplink transmission power comprises:

determining an amount of an anticipated uplink attenuation component caused by antenna pointing error based on said amount of the downlink attenuation component caused by antenna pointing error;

determining an amount of an anticipated uplink attenuation component caused by rain based on said amount of the downlink attenuation component caused by rain; and adjusting said uplink transmission power based on said amount of the anticipated uplink attenuation component caused by antenna pointing error and based on said amount of the anticipated uplink attenuation component cause by rain.

11. The method of claim 10, wherein determining said amount of the anticipated uplink attenuation component comprises scaling said downlink attenuation component by an expected atmospheric attenuation factor.

12. The method of claim 11, wherein scaling comprises scaling downlink attenuation component by an expected rain fade atmospheric attenuation factor.

13. The method of claim 7, wherein adjusting said uplink transmission power comprises adjusting said uplink transmission power according to:

$p+r*f$, where p is said downlink attenuation component caused by satellite antenna pointing error, r is said downlink attenuation component caused by rain, and f is an expected atmospheric attenuation factor between an uplink transmit frequency and a downlink receive frequency.

14. The method of claim 7, wherein determining said amount of a downlink attenuation component caused by satellite antenna pointing error comprises determining said downlink attenuation component based in part on a ground station location in a satellite antenna downlink gain pattern.

15. An uplink transmission power control system comprising:

a ground station for measuring an amount of downlink attenuation of a communications signal passing over the downlink from a satellite;

a processing station for determining satellite antenna pointing direction with respect to the ground station; and a communication link for carrying the satellite antenna pointing direction to the ground station; wherein the ground station determines an amount of an antenna pointing error attenuation component of said downlink attenuation based on said satellite antenna pointing direction and an amount of an atmospheric attenuation component of said downlink attenuation and determines an uplink transmission power adjustment based on said amount of the antenna pointing error attenuation component and said amount of the atmospheric attenuation component to compensate for said downlink attenuation.

16. The uplink transmission power control system of claim 15, wherein the processing station is a central processing station operative to determine antenna pointing directions with respect to a plurality of ground stations.

17. The uplink transmission power control system of claim 15, wherein the atmospheric attenuation component is a rain fade component.

18. The uplink transmission power control system of claim 15, wherein the uplink transmission power adjustment is determined according to:

$p+(a-p)*f$, where p is said antenna pointing error attenuation component, a is said downlink attenuation, and f is an expected atmospheric attenuation factor between an uplink transmit frequency and a downlink receive frequency.

19. The uplink transmission power control system of claim 18, wherein 'f' is an expected rain fade atmospheric attenuation factor.

20. The uplink transmission power control system of claim 15, wherein the ground station is a cellular telephone.

* * * * *